Aug. 31, 1965 J. R. OWEN 3,203,636
ELECTRICAL APPARATUS
Filed Nov. 28, 1962
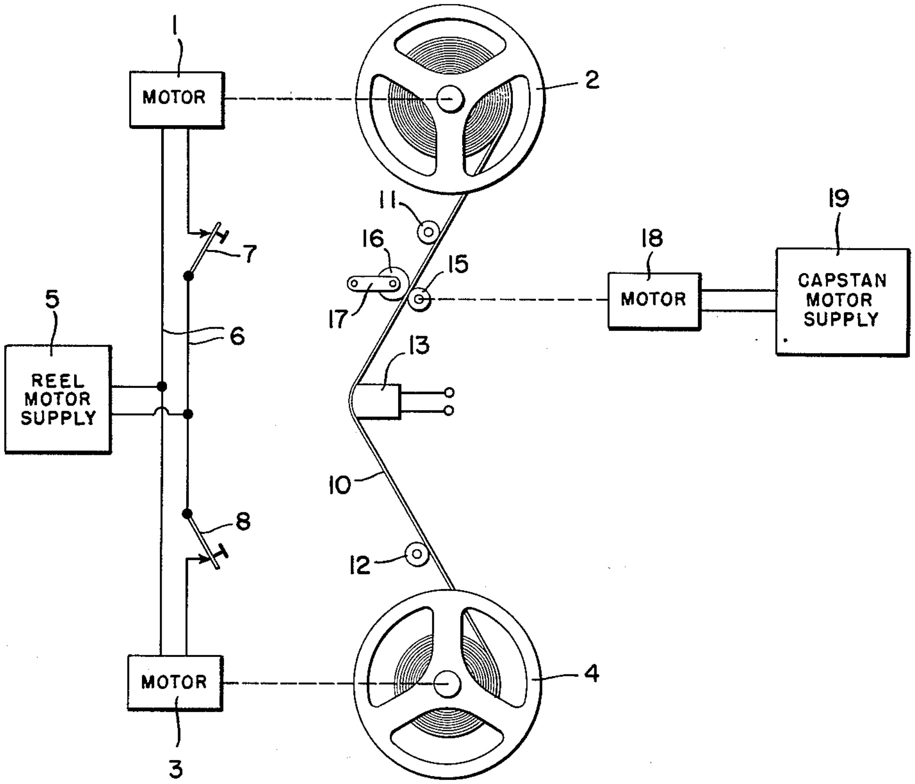
INVENTOR.
JAMES R. OWEN
BY Arthur H. Swanson
ATTORNEY.

United States Patent Office 3,203,636

Patented Aug. 31, 1965

3,203,636
ELECTRICAL APPARATUS

James R. Owen, Littleton, Colo., assignor to Honeywell Inc., a corporation of Delaware Filed Nov. 28, 1962, Ser. No. 240,660
4 Claims. (Cl. 242—55.12)

This invention relates to tape transports. More specifically, the present invention relates to a tape drive for a tape transport.

An object of the present invention is to provide an improved tape drive for a tape transport.

Another object of the present invention is to provide an improved tape drive for driving a tape at a constant speed while maintaining the tape under constant tension.

Still another object of the present invention is to provide an improved transport apparatus for maintaining a constant tension in a driven web member.

A further object of the present invention is to provide an improved tape drive, as set forth herein, having a simple operation and construction.

In accomplishing these and other objects, there has been provided, in accordance with the present invention, a tape drive comprising a driven capstan for driving a tape at a constant speed between tape reels, a supply reel motor, a take-up reel motor and a power supply for supplying the reel motors in parallel with an energizing signal. The signal from the supply is effective to divide between the reel motors in accordance with the height of the tape upon the associated reel whereby the applied current-induced torque of the reel motors is proportioned to maintain a constant tension in the tape.

A better understanding of the present invention may be had from the following detailed description when read in connection with the accompanying drawing in which the single figure is a schematic representation of a tape drive embodying the present invention.

Referring to the single figure drawing in more detail, there is shown a tape drive apparatus embodying the present invention and comprising a supply reel direct-current motor 1 arranged to drive a supply reel 2. A take-up reel direct-current motor 3 is similarly arranged to drive a take-up reel 4. The motors 1 and 3 are supplied with an energizing signal from a constant current reel motor supply 5. The energizing signal from the supply 5 is applied to both reel motors 1 and 3 along a pair of wires 6. A fast forward switch 7 is used to selectively disconnect the supply 5 from the supply reel motor 1, and a reverse switch 8 is used to disconnect the supply 5 from the take-up reel motor 3.

A recording tape 10 is supported in a tape path between the reels 2 and 4 by a pair of guide rollers 11 and 12. The tape 10 is passed over a magnetic head 13 to effect an operative relationship therewith. A capstan 15 and pinch roller 16 are used to supply a driving force to the tape 10. The pinch roller 16 is pivotally supported on an arm 17 to selectively press the tape 10 against the capstan 15. The selective actuation of the roller 16 may be effected by any suitable means; such devices being well-known in the art. The capstan 15 is driven by a capstan motor 18 which is supplied with an energizing signal from a capstan motor supply 19.

In operation, the apparatus of the present invention is effective to drive the tape 10 between the reels 2 and 4 while maintaining the tape 10 under continuous tension. The reel motors 1 and 3 are arranged to drive the reels 2 and 4 in opposite directions; i.e., the direction of motion of the take-up reel 4 opposes the motion of the supply reel 2 with both motors trying to wind the tape 10 on their respective reels. The tape 10 is uniformly driven by the capstain 15 in a predetermined direction;

e.g., from the supply reel 2 to the take-up reel 4. In order to maintain a uniform operative relationship with the head 13 during this uniform driving operation, it is desirable to maintain a constant tension in the tape 10. The present invention is effective to achieve this constant tension by making the effective torques developed by each reel motor, as applied at the outer radius of the tape on the associated reel, equal at all times. Inasmuch as the tape radius on a reel is constantly changing as a result of the driving effect of the capstan 15, the actual torque of each motor must also vary to maintain the aforesaid relationship.

It may be seen that the actual torque T developed by a permanent magnet motor is proportional to the armature current. Further, the back emf, or effective motor impedance, is directly proportional to the angular velocity of the armature. Designating the effective motor impedances of motors 1 and 3 as $R_1$ and $R_2$, respectively, it may be seen that the current I through each motor is determined by a parallel circuit equivalent which is effective to divide the current $I_s$ from the supply 5. Thus, the current through motor 1 is:

$$I_3=\frac{R_1 I_s}{R_2+R_1} \tag{1}$$

and the current through motor 3 is:

$$I_3=\frac{R_1 I_s}{R_2+R_1} \tag{2}$$

which may be combined as:

$$I_2 R_2=I_1 R_1 \tag{3}$$

Since the velocity of the tape 10 is held constant by the effect of the capstan motor 18, it may be seen that the angular velocity of the reel 2 multiplied by the radius arm of the tape on the reel 2 is equal to the aforesaid constant velocity. Similarly, the angular velocity of reel 4 multiplied by the radius arm of the tape on the reel 4 is also equal to the constant tape velocity. Thus, with W representing angular velocity and $r$ as the tape radius arm:

$$r_1 W_1=r_2 W_2=\text{constant}$$

and $$W_1=\frac{r_2 W_2}{r_1}$$

Substituting this function of $W_1$ in Equation (3), by the equivalence of angular velocity and effective impedance, gives:

$$\frac{I_1}{r_1}=\frac{I_2}{r_2}$$

and since motor current is proportional to the torque developed:

$$\frac{T_1}{r_1}=\frac{T_2}{r_2}$$

which is the aforesaid relationship between the torque of each motor and the radius arm of the tape required to maintain a constant tension in the tape 10 as the tape 10 is driven between the reels 2 and 4 by the capstan 15.

The fast forward switch 7 may be opened while the pinch roller 16 is disengaged from the capstan 15 to provide a fast windup of the tape 10 on the reel 4 by the sole effect of the motor 3. Similarly, a reverse motion of the tape 10 may be effected by opening the reverse switch 8 to allow the motor 1 to drive the reel 2 without hindrance.

Accordingly, it may be seen that there has been provided in accordance with the present invention, an improved tape drive for a tape transport for driving a tape between tape reels while maintaining a constant tension in the tape.

What is claimed is:

1. A tape drive for a recording tape comprising a driven capstan engaging said tape and operative to drive said tape at a predetermined speed, a tape supply reel, a tape take-up reel, a first direct-current motor driving said supply reel, a second direct-current motor driving said take-up reel, a direct-current motor supply operative to supply a motor energizing signal and circuit means simultaneously connecting said first and second motors in parallel to said motor supply whereby to oppose a torque of said first motor exerted on said tape against a torque of said second motor on said tape and to divide said motor energizing signal between said motors in inverse proportion to the respective amounts of tape on said supply reel and said take-up reel.

2. A constant tension drive system for a web member driven at a constant speed between storage reels comprising a supply reel direct-current motor, a take-up reel direct-current motor, a direct-current motor supply operative to supply a motor energizing signal and circuit means simultaneously connecting said supply reel motor and said take-up reel motor in parallel to said motor supply whereby to oppose a torque of said first motor exerted on said web member against a torque of said second motor on said web member and to divide said motor energizing signal between said motors in inverse proportion to the respective amounts of said web member on said storage reels.

3. A drive system for a web member driven between storage reels comprising a first direct-current reel motor arranged to drive a first reel, a second direct-current reel motor arranged to drive a second reel to tension a web member disposed between said first reel and said second reel, a direct-current reel motor supply operative to supply a motor energizing signal, circuit means operative to connect said first motor and said second motor in parallel to said motor supply whereby to oppose a torque of said first motor exerted on said web member against a torque of said second motor on said web member and to divide said motor energizing signal between said motors in inverse proportion to the respective amounts of said web member on said first reel and said second reel, a capstan means arranged to selectively drive said web member and a capstan motor supply means for selectively energizing said capstan means to drive said web member.

4. A drive system as set forth in claim 3 wherein said circuit means includes switch means operative to selectively disconnect said first motor and said second motor from said reel motor supply.

References Cited by the Examiner

UNITED STATES PATENTS 2,060,672 11/36 Heymann.

MERVIN STEIN, *Primary Examiner.*

RUSSELL C. MADER, *Examiner.*